United States Patent [19]

Kato et al.

[11] 4,217,644
[45] Aug. 12, 1980

[54] APPARATUS FOR INDICATING THE DISTANCE OVER WHICH A VEHICLE CAN TRAVEL WITH THE RESIDUAL FUEL

[75] Inventors: Yoshiaki Kato; Hirotsugu Yamaguchi, both of Fujisawa, Japan

[73] Assignee: Nissan Motor Company, Limited, Yokohama, Japan

[21] Appl. No.: 973,965

[22] Filed: Dec. 28, 1978

[30] Foreign Application Priority Data

Jan. 14, 1978 [JP] Japan .................... 53-2931

[51] Int. Cl.² .......................................... G01M 13/26
[52] U.S. Cl. ..................................... 364/442; 73/113; 235/92 FL; 364/561
[58] Field of Search ................ 364/442, 561; 235/92 FL, 92 DN, 61 J, 92 MT; 73/113, 114

[56] References Cited

U.S. PATENT DOCUMENTS

| Re. 15,651 | 7/1923 | Stuber | 364/442 |
|---|---|---|---|
| 2,772,049 | 11/1956 | Griffith | 364/442 |
| 2,783,940 | 3/1957 | Hartman | 364/442 |
| 2,955,464 | 10/1960 | Elwell, Jr. | 364/442 |
| 3,983,372 | 9/1976 | Klaver | 364/442 |
| 4,046,998 | 9/1977 | Kuno et al. | 364/442 |

FOREIGN PATENT DOCUMENTS 2534941  2/1976  Fed. Rep. of Germany .......... 364/442

Primary Examiner—Errol A. Krass

[57] ABSTRACT

An apparatus for indicating the distance over which a vehicle can travel with the residual fuel, comprises circuitry for producing a signal indicative of the fuel consumption rate of the engine of the vehicle, a fuel level sensor for measuring the amount of fuel contained in the fuel tank of the vehicle, and a multiplier for producing a signal indicative of the distance over which the vehicle can travel with the residual fuel remaining in the fuel tank by multiplying the fuel consumption rate by the amount of fuel contained in the fuel tank, where the distance obtained by the multiplier is displayed by a display unit. The fuel consumption rate is detected by either dividing the distance travelled per a predetermined period of time by the amount of fuel consumed per the predetermined period of time or dividing a predetermined distance by the amount of fuel consumed per a travel of the predetermined distance.

7 Claims, 8 Drawing Figures

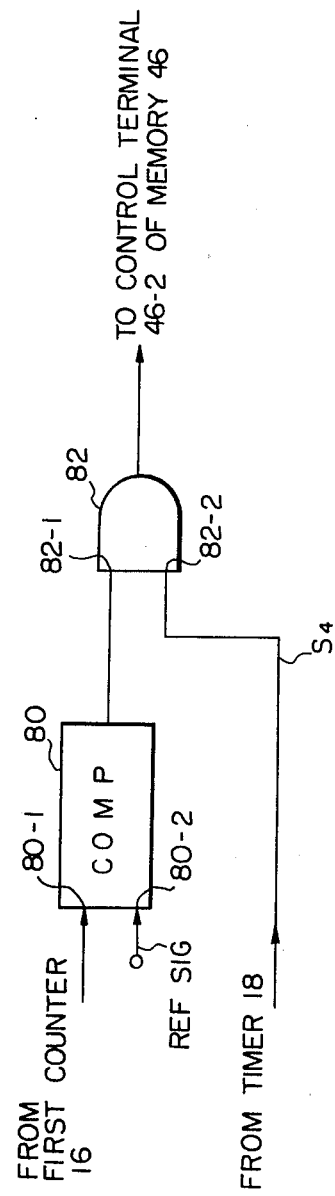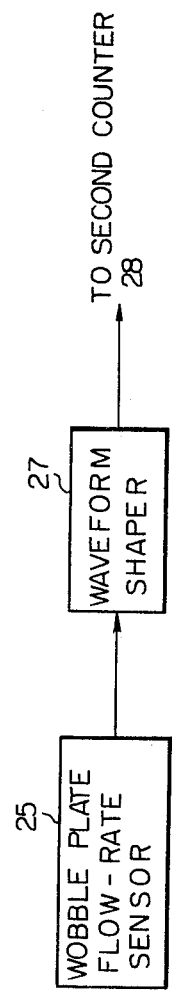

APPARATUS FOR INDICATING THE DISTANCE OVER WHICH A VEHICLE CAN TRAVEL WITH THE RESIDUAL FUEL

FIELD OF THE INVENTION

This invention generally relates to an apparatus for displaying the distance over which a vehicle can travel with the residual fuel. More specifically, the present invention relates to such an apparatus which displays the distance possibly travelled by the vehicle in view of the fuel consumption rate and the amount of fuel remaining in the fuel tank of the vehicle.

BACKGROUND OF THE INVENTION

Usually vehicles the prime mover of which is actuated by fuel are equipped with a fuel gauge for indicating the amount of fuel contained in the fuel tank. For instance, a fuel gauge for an automotive vehicle has a movable pointer for indicating the amount of fuel contained in the fuel tank by measuring the fuel level of the residual fuel. With this conventional fuel gauge, the vehicle driver can only estimate the amount of fuel remaining in the fuel tank. When the pointer of the fuel gauge is around a position indicating that the fuel tank is empty, the vehicle driver has to guess the distance that the vehicle can travel with the residual fuel.

Recently, various fuel consumption meters are provided for indicating the fuel consumption rate of the engine of the vehicle. However, such a fuel consumption rate meter does not satisfy the vehicle driver since it does not indicate how long the vehicle can travel with the residual fuel.

Further, an apparatus for indicating the distance that the vehicle can travel with the residual fuel is proposed in a Japanese patent pre-publication (publication before the examination) No. 51-54140. In accordance with the apparatus disclosed in the pre-publication, a predetermined amount of fuel corresponding to the capacity of the fuel tank is preset when the fuel tank is full, and the residual amount of fuel estimated by the preset amount of fuel and a fuel consumption rate of the engine of the vehicle is divided by the fuel consumption rate. However, the fuel consumption rate is not actually measured but a fixed value selected out of three (high, medium and low) values is used wherein the vehicle driver is supposed to select one fixed value via estimation of the operating condition of the engine and the vehicle.

Therefore, it will be seen that the accuracy of the distance detected by the division is not high since the actual fuel consumption rate varies radically in accordance with the way of driving of the vehicle, gear position, changes of load, air temperature, etc. Further, in the apparatus disclosed in the pre-publication, since the amount of fuel is to be preset with a predetermined value, the vehicle driver has to operate a key or a switch to preset the same whenever the fuel tank of the vehicle is filled with fuel. Further, the above-mentioned apparatus does not include a memory to store the amount of residual fuel remaining in the fuel tank, and thus the apparatus does not work after the power supply (usually controlled by the ignition key) is turned off, until the predetermined value corresponding to the capacity of the fuel tank is preset again.

SUMMARY OF THE INVENTION

The present invention has been developed in order to overcome the above-mentioned drawbacks and disadvantages of the conventional apparatus for indicating the distance over which the vehicle can travel with the residual fuel. In the present invention, the fuel consumption rate and the amount of fuel contained in the fuel tank are respectively detected automatically at every predetermined period of time or at every predetermined distance travelled by the vehicle. The detected informations of the fuel consumption rate and the amount of fuel remaining in the fuel tank are used to estimate the distance that the vehicle can travel with the residual fuel and this distance is displayed in the form of numerals to inform the same to the vehicle driver. Further a suitable memory which is arranged not to be influenced by the cut off of power supply is provided for storing the distance so that the vehicle driver may ascertain the distance whenever he wishes to see it.

It is therefore, an object of the present invention to provide an improved apparatus for displaying an accurate distance that the vehicle can travel with the residual fuel.

Another object of the present invention is to provide such an apparatus in which the distance that the vehicle can travel with the residual fuel is automatically ascertained without presetting the amount of fuel supplied to the fuel tank.

Further object of the present invention is to provide such an apparatus in which the distance over which the vehicle can travel with the residual fuel is obtained without being influenced by the cut off of the power supply.

BRIEF DESCRIPTION OF THE DRAWINGS

These and other objects and features of the present invention will become more readily apparant from the following detailed description of the preferred embodiments taken in conjunction with the accompanying drawings in which:

FIG. 7 shows in schematic block diagram form a circuit arrangement used for modifying the first embodiment shown in FIG. 1; and FIG. 8 shows in schematic block diagram form a circuit arrangement for measuring fuel flow rate in the fuel passage of the carburetor of the engine, which may take place of circuits for producing a pulse signal indicative of the fuel flow rate in the fuel injection system, which are shown to be included in the first and second embodiments respectively shown in FIG. 1 and FIG. 6.

DETAILED DESCRIPTION OF THE PREFERRED EMBODIMENTS

Figure 1:
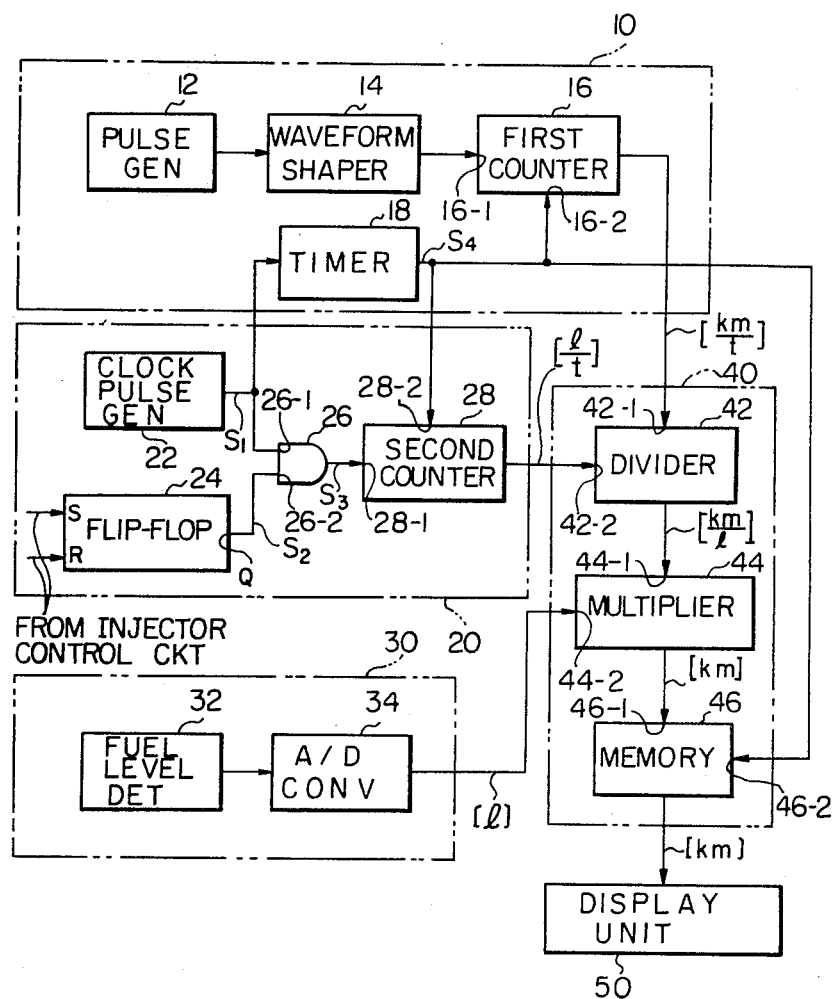
FIG. 1 shows in schematic block diagram form a first preferred embodiment of the apparatus for displaying the distance that the vehicle can travel with the residual fuel according to the present invention.

FIG. 1 illustrates a schematic view of a first preferred embodiment of the apparatus for displaying the distance over which the vehicle can travel with the residual fuel according to the present invention. The circuit arrangement shown in FIG. 1 consists of a travelled distance measuring unit which is generally denoted by 10, a fuel consumption measuring unit which is generally denoted by 20, a fuel level measuring unit which is generally denoted by 30, an operation and memory unit which is generally denoted by 40, and a display unit which is denoted by 50.

The above-mentioned five units included in the apparatus are common throughout all embodiments which will be discussed hereinlater. The same elements or circuits which are used in various embodiments are indicated by the same reference numerals throughout the specification.

The travelled distance measuring unit 10 of the first embodiment consists of a pulse generator 12, a waveform shaper 14, a first counter 16, and a timer 18. The pulse generator 12 is arranged to produce a pulse each time the vehicle travels a predetermined unit distance. For producing a pulse train signal, the pulse generator 12 such as a tachometer generator is operatively connected to the drive shaft of the transmission or other mechanism such as the odometer and the speedometer of the vehicle. The output of the pulse generator 12 is connected to an input of the waveform shaper 14 the output of which is connected to an input 16-1 of the first counter 16. The waveform shaper 14, such as a schmitt triger circuit, is provided for shaping the waveform of the pulse signal produced in the pulse generator 12 and thus produces a pulse signal of a logic level. However, if the pulse signal generator 12 is arranged to produce an output pulse signal of a logic level, the waveform shaper 14 may be omitted. With this arrangement, a pulse train signal is applied to the input of the first counter 16, where the number of pulses per unit time indicates the speed of the vehicle. The first counter 16 has a control terminal 16-2 and is controlled in response to a control signal, which is referred to as a gate signal, applied thereto. The gate signal which is indicated by $S_4$ is produced by the timer 18. The timer 18 is any one of conventional circuits, which produces a pulse signal the pulse width of which is predetermined. In this embodiment, a counter (not shown) is used as the timer circuit and is responsive to an input pulse train signal. The input pulse train signal $S_1$ is fed from the clock pulse generator 22 included in the fuel consumption measuring unit 20. The counter which functions as the timer 18 is preset with a predetermined value so as to produce an output signal when the number of pulses applied to the input thereof reaches the predetermined value. The timer 18 thus produces the gate signal $S_4$ with which the first counter 16 is enabled. Since the function of the timer 18 is to provide a reference period of time for which the first counter is enabled, other circuit such as a monostable multivibrator may be used as the timer if desired. With this provision, the first counter 16 produces an output signal indicative of a distance travelled by the vehicle per a unit time such as one minute and this signal is fed to an input of the operation and memory unit 40 where the unit of the factor indicated by the output signal of the first counter 16 is denoted by Km/t.

Figure 2:
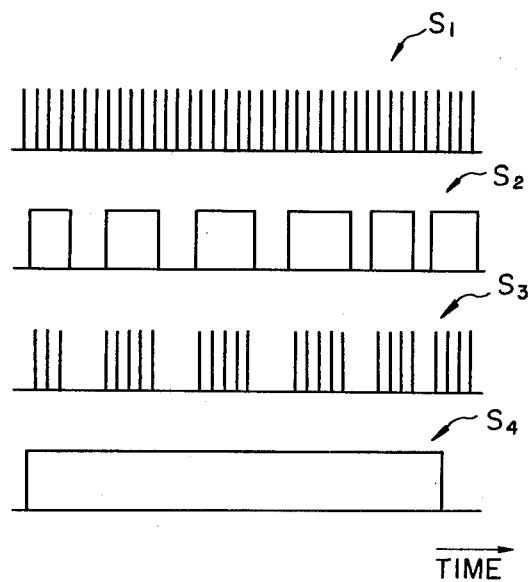
FIG. 2 shows various waveforms of signals produced in the circuitry shown in FIG. 1.

The fuel consumption measuring unit 20 consists of the above-mentioned clock pulse generator 22, a flip-flop 24, an AND gate 26, and a second counter 28. The clock pulse generator 22 is of a conventional type and is arranged to produce a pulse train signal in which the duration of pulses corresponds to a unit time such as 1 milli second. The output of the clock pulse generator 22 is connected to the input of the timer 18 as mentioned above and to a first input 26-1 of the AND gate 26. The flip-flop 24 is responsive to signals from an injector control circuit (not shown) which produces a pulse signal with which fuel injectors such as fuel injection valve disposed in the intake manifold of the engine are actuated. As well known, the amount of fuel injected into the combustion chambers such as cylinders or rotor housing of the internal combustion engine is controlled in accordance with the pulse width of the valve energization signal. The flip-flop 24 is set and reset in response to signals applied to the set terminal S and the rest terminal R thereof for producing a pulse signal at the output Q so that the pulse width of the output pulse signal of the flip-flop 24 corresponds to the amount of fuel, i.e. fuel flow rate, supplied via the injectors into the engine. The output signal of the flip-flop 24 is indicated by $S_2$ and is supplied to a second input 26-2 of the AND gate 26. The AND gate 26 thus produces an output signal $S_3$ only when both of the inputs thereof receive the signals $S_1$ and $S_2$ of a logic "1" level. The waveforms of the signals $S_1$, $S_2$, $S_3$ and $S_4$ are shown in FIG. 2 for convenience. It will be seen from FIG. 2, that the number of clock pulses transmitted via the AND gate 26 is determined by the pulse width of the pulse signal $S_2$.

The output signal, i.e. the signal $S_3$ of the AND gate 26 is supplied to an input 28-1 of the second counter 28. The second counter 28 has a control terminal 28-2 for receiving the above-mentioned gate signal $S_4$ from the timer 18 included in the travelled distance measuring unit 10. Namely, the same gate signal $S_4$ which is used as the control signal for the first counter 16 is also used as a control signal for the second counter 28. The second counter 16 produces an output signal indicative of the number of pulses applied to the input thereof 28-1 by counting the same for a predetermined period of time defined by the pulse width of the gate signal $S_4$ in the same manner as the first counter 16. Since the pulse width of the signal $S_2$ of the flip-flop 24 corresponds to the fuel flow rate as described hereinbefore, the output signal of the second counter 28 is an indication of the fuel flow rate, i.e. the amount of fuel supplied to the engine per a predetermined period of time, such as one minute. The unit of the fuel flow rate is expressed in terms of l/t. The output signals of the first and second counters 16 and 28 are respectively supplied to the operation and memory unit 40 which will be described hereinafter.

The operation and memory unit 40 consists of a divider 42, a multiplier 44, and a memory 46. The divider 42 has first and second inputs 42-1 and 42-2 which are respectively connected to the outputs of the first counter 16 and the second counter 28. The divider 42 is arranged to produce an output signal indicative of a factor the unit of which is expressed in terms of Km/l by dividing the value indicated by the output signal of the first counter 16 by the value indicated by the output signal of the second counter 28. This means that the divider 42 output signal is an indication of a distance travelled by the vehicle with a predetermined amount of fuel, viz. one litter in this case.

The output signal of the divider 42 is then supplied to a first input 44-1 of the multiplier 44 which has a second input 44-2 for receiving a signal indicative of the amount of fuel contained in the fuel tank. The signal indicative of the amount of fuel is produced in the fuel level measuring unit 30 which consists of a fuel level detector 32 and an A/D (analog to digital) converter 34. The fuel level detector 32 will be described in detail in connection with FIGS. 3, 4 and 5 hereinlater and is arranged to produce an analog signal proportional to the amount of fuel contained in the fuel tank. The output of the fuel level detector 32 is connected to an input of the A/D converter which is of a conventional type and thus the analog signal produced in the fuel level detector 32 is converted into a digital signal indicative of the amount of fuel.

The multiplier 44 produces an output signal indicative of a distance by multiplying the value fed from the divider 42 by the value fed from the fuel level measuring unit 30. The product produced by the multiplication is an indication of a distance over which the vehicle can travel with the amount of the fuel remaining in the fuel tank. The unit of the distance indicated by the output signal of the multiplier 44 is expressed in terms of Km. This signal is fed to an input 46-1 of the memory 46 to be stored therein and is supplied via the same to the display unit 50 for displaying the distance in the form of numerals. The memory 46 has a control terminal 46-2 for receiving the gate signal $S_4$ produced in the timer 18. The memory 46 is arranged to store the information applied to the input 46-1 each time the gate signal $S_4$ is fed thereto. Consequently, the memory 46 clears the stored memory upon presence of the gate signal $S_4$ and new information, i.e. the distance calculated by the multiplier 44 is stored therein. Therefore, the numerals displayed at the display unit 50 change at every predetermined period of time defined by the output signal of the timer 18. Assuming the vehicle keeps travelling, the distance displayed decreases and the decrease rate of the time 18. However, if desired, other reference time signal may be used. In other words, the control terminal 46-2 of the memory may be responsive to other gate signal which is produced by a suitable timer circuit so as to control the memory function at every predetermined period of time different from that of the gate signal $S_4$. Assuming the vehicle keeps travelling, the distance displayed decreases and the decrease rate of the distance varies in accordance with the fuel consumption rate.

Figure 3:
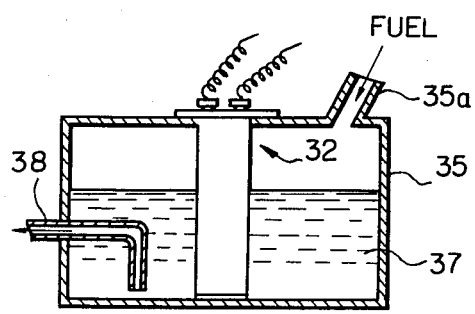
FIG. 3 shows a schematic view of a fuel tank which includes the fuel level detector shown in FIG. 1.
Figure 4:
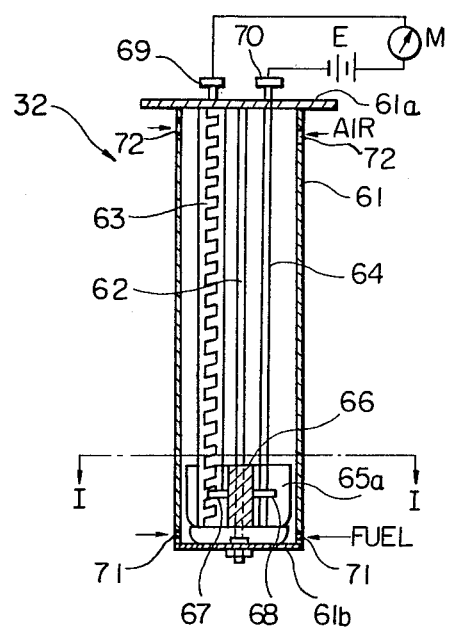
FIG. 4 shows a detailed view, in the form of a sectional view taken along the line II—II in FIG. 5, of the fuel level detector shown in FIG. 3.
Figure 5:
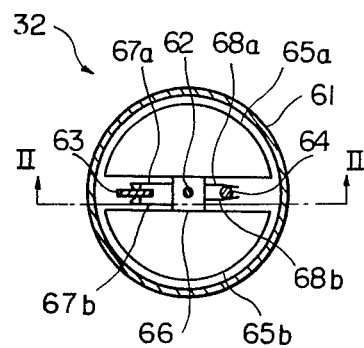
FIG. 5 shows a sectional view of the fuel level detector shown in FIG. 4, taken along the line I—I.

Referring now to FIG. 3, FIG. 4 and FIG. 5 which show the fuel level detector 32 shown in FIG. 1, FIG. 3 illustrates a fuel tank 35 of the vehicle. The fuel tank 35 has an inlet port 35a and an outlet port 38. The fuel 37 which is shown to be contained in the fuel tank 35 is arranged to induced via the inlet port 35a into the chamber (no numeral) of the fuel tank and is further arranged to led to the intake manifold via a suitable mechanism such as a fuel pump, a filter and/or a reservoir from the outlet port 38. The fuel tank 35 further comprises the fuel level detector 32 the detailed construction of which is shown in FIGS. 4 and 5. The fuel level detector 32 is disposed about the center of the fuel tank 35 by fixedly connected to the upper portion of the fuel tank 35 in a manner such that the whole device of the fuel level detector 32 depends from the upper portion of the fuel tank 35.

FIG. 4 and FIG. 5 respectively show the sectional views of the fuel level detector 32, in which the sectional view shown in FIG. 4 is one that taken along the line II—II of the other sectional view shown in FIG. 5, while the sectional view shown in FIG. 5 is one that taken along the line I—I of the sectional view shown in FIG. 4. As shown in FIG. 4 and FIG. 5, the fuel level detector 32 consists of a cylinder 61, a top plate 61a, a bottom plate 61b, two terminals 69 and 70, a guide bar 62, a resistor 63, a conductive bar 64, two floats 65a and 65b, movable contacts 67a, 67b, 68a and 68b, and a connector 66.

The top plate 61a and the bottom plate 61b are respectively connected fixedly to the upper and lower ends of the cylinder 72 which has several openings 71 and 72 at the lower and upper portions. The openings 71 are provided for communicating the inside portion of the cylinder 61 with the fuel contained in the fuel tank 35, while the upper openings 72 are provided for communicating the inside portion of the cylinder 61 with the air in the fuel tank 35. It is advantageous to provide such openings 72 for reducing the wave-motion of the fuel at the surface thereof. The guide bar 62 is fixedly connected to the top plate 61a and the bottom plate 61b via a suitable screw (no numeral). The connector 66 is arranged to reciprocatively move up and down with respect to the guide bar 62. The two floats 65a and 64b respectively have semi circle shapes as shown and are fixedly connected to the connector 66. The outer surfaces of the floats 65a and 65b are arranged to have a space with respect to the inner surface of the cylinder 61. The resistor 62 and the conductive bar 64 are respectively disposed in the cylinder 61 in substantially parallel to the guide bar 62. The resistor 63 is schematically shown and is actually a resistance material printed on a suitable insulating member (no numeral). The four movable contacts 67a, 67b, 68a and 68b which are made of leaf springs are fixedly connected to the connector 66 so as to move up and down together with the floats 65a and 65b. The contacts 67a and 67b are arranged to contact with the resistor 63 by sliding the surfaces thereof, while the contacts 68a and 68b are arranged to contact with the conductive bar 64 by sliding the surfaces thereof, and further the contacts 67a, 67b, 68a and 68b are electrically connected to each other. Since the floats 65a and 65b are arranged to move up and down in accordance with the fuel level in the fuel tank 35, the movable contacts 67a and 67b vary the position along the resistor 63. One terminal of the resistor 63 and the conductive bar 64 are respectively coupled with the terminals 69 and 70 disposed on the top plate 61a which is made of an insulating material.

It will be seen that the resistance between the two terminals 69 and 70 vary in accordance with the position of the floats 65a and 65b so that the resistance therebetween is an indication of the fuel level in the fuel tank 35. A series circuit of a battery E and an ammeter M or a voltmeter is shown to be connected to the terminals 69 and 70 to indicate the fuel level via the position of the pointer of the meter M. Since the voltage across the meter or the electric current via the same indicates the fuel level, this signal may be used as the output of the fuel level detector 32.

Figure 6:
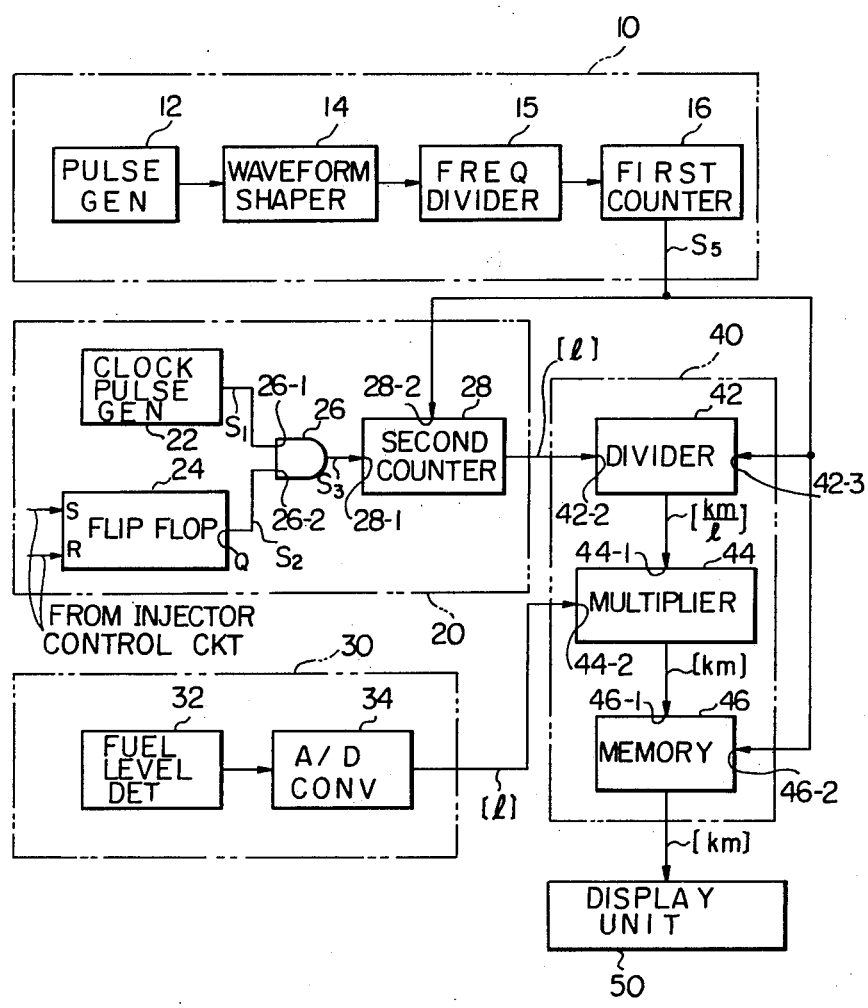
FIG. 6 shows in schematic block diagram form a second preferred embodiment of the apparatus according to the present invention.

Reference is now made to FIG. 6 which shows in block diagram form the second preferred embodiment of the apparatus according to the present invention. The circuitry arrangement of the second embodiment is similar to that of the first embodiment shown in FIG. 1. The difference between the first and second embodiments is seen in the construction of the travelled distance unit 10. The travelled distance unit 10 of the second embodiment has a frequency divider 15 in addition to the pulse generator 12, waveform shaper 14 and the first counter 16, while timer 18 used in the first embodiment is omitted.

Since the functions of the pulse generator 12 and the waveform shaper 14 are the same as those in the first embodiment, the description thereof is omitted. The output of the waveform shaper 14 is connected to an input of the frequency divider 15 the output of which is connected to the input of the first counter 16. The frequency divider 15 is arranged to divide the number of pulses applied from the waveform shaper 14 by a predetermined number so that the number of pulses per unit time is reduced to an extent. The first counter 16 is of a presettable type and counts the number of pulses produced by the frequency divider 15 and is arranged to produce an output pulse signal when the number of pulses reaches a predetermined number corresponding to a unit distance, such as one kilometer. The output pulse signal, which is denoted by $S_5$, of the first counter 16 functions as a gate signal and is fed to the control terminal 28-2 of the second counter 28, to a control terminal 42-3 of the divider 42, and to the control terminal 46-2 of the memory 46.

The circuit arrangement of the fuel consumption measuring unit 20 has the same construction as the first embodiment, wherein the second counter 28 is controlled by the above-mentioned gate signals $S_5$ applied from the first counter 16. Namely, the second counter 28 counts the number of pulses fed via the AND gate 26 for a period of time with which the vehicle travels the unit distance, i.e. one kilometer in this case. It will be seen therefore, that the output signal of the second counter 28 is an indication of the amount of fuel supplied to the engine during a travel of a unit distance. The unit of the amount of fuel may be expressed in terms of l.

The divider 42 is of a presettable type and a signal indicative of the unit distance is preset. The divider 42 is responsive to the amount of fuel used per unit distance of travel and is arranged to divide the preset value, i.e. the unit distance by the amount of fuel used per unit distance when the gate signal $S_5$ is applied from the first counter 16 to the control terminal 42-3 thereof. With this provision, the divider 42 produces an output signal indicative of a factor expressed in terms of Km/l. The output signal of the divider 42 is fed to the first input 44-1 of the multiplier 44 and is used in the same manner as in the first embodiment. The memory 46 the control terminal 46-2 of which is responsive to the gate signal $S_5$ applied from the first counter 16, is arranged to store the output signal supplied from the multiplier 44 each time the gate signal $S_5$ is fed to the control terminal 46-2. Although in the second embodiment shown in FIG. 6, the first counter 16 is arranged to produce the output pulse signal which is used as the gate signal $S_5$ by counting the number of pulses applied from the frequency divider 15, if the frequency divider 15 is arranged to produce an output pulse signal when a predetermined number of pulses is applied thereto from the waveform shaper 14, the output signal of the frequency divider 15 may be used as the gate signal $S_5$ and thus the first counter 16 may be omitted.

In comparison between the first and second embodiments respectively shown in FIG. 1 and FIG. 6, the output signal of the first counter 16 used in the first embodiment may indicate zero if the vehicle is in an idling operation for the predetermined period of time and thus the result of the division by the divider 42 is zero so that the numeral displayed at the display unit 50 indicates also zero irrespectively of the amount of fuel in the fuel tank 35, while the numeral displayed at the display unit 50 in the second embodiment does not equal zero unless the amount of fuel contained in the fuel tank 35 falls zero since a predetermined distance is preset in the divider 42. In other words, in the first embodiment since the fuel consumption rate is detected at every predetermined period of time, if the distance travelled by the vehicle for the predetermined period of time is zero, the result of the calculations is zero and therefore, the distance over which the vehicle can travel is erroneously detected. In order to prevent this erroneous detection, a suitable gate circuit may be interposed between the timer 18 and the memory 46 for supplying the gate signal $S_4$ produced by the timer 18 to the memory 46 only when the output signal of the first counter 16 indicates a distance other than zero which may be detected by a suitable comparator. On the other hand, in the second embodiment such an erroneous detection does not occur.

Hence, reference is made to FIG. 7 which shows a circuit arrangement for preventing the above-mentioned erroneous detection, which is used only for the first embodiment. The circuit shown in FIG. 7 consists of a comparator 80 and an AND gate 82. The comparator 80 has first and second inputs 80-1 and 80-2 which are respectively connected to the output of the first counter 16 and a suitable reference signal supply. The comparator 80 is arranged to produce an output signal of a logic level when the distance indicated by the output signal of the first counter 16 is over zero. The output of the comparator 80 is connected to a first input 82-1 of the AND gate 82 which has a second input 80-2 connected to the output of the timer 18 for receiving the gate signal $S_4$. The output of the AND gate 82 is connected to the control terminal 46-2 of the memory 46 for supplying gate signal $S_4$ thereto only when the distance travelled by the vehicle is over zero. With this arrangement the memory 46 is triggered to store the input information only when the distance travelled by the vehicle is over zero, and thus the above-mentioned erroneous detection of the distance over which the vehicle can travel is prevented. If the vehicle is in an idling operation for a long period of time which is longer than the predetermined period of time defined by the gate signal $S_4$, a distance previously stored in the memory 46 is not cancelled and thus the stored distance is displayed at the display unit 50. This means that the displayed distance does not change as long as the idling operation is kept. Since the fuel flow rate during an idling operation is relatively low compared to regular operations, the error of the displayed distance, which will occur when an idling operation is maintained, is negligible.

Although the first and second embodiments shown in FIG. 1 and FIG. 6 are described in connection with fuel injection system of an internal combustion engine, the apparatus according to the present invention may be adopted to a carburetor system. When the apparatus according to the present invention is used for the carburetor system of an engine, a suitable fuel flow detector is provided for measuring the fuel flow rate. This means that an apparatus for indicating the distance over which a vehicle can travel with the residual fuel may be constructed in the same manner as shown in FIG. 1 and FIG. 6 with some modifications in connection with the fuel consumption measuring unit 20.

Hence, reference is now made to FIG. 8 which shows in schematic block diagram form the above-mentioned modifications. The circuit arrangement shown in FIG. 8 consists of a wobble plate flow-rate sensor 25 which is disposed in the fuel passage of the carburetor (not shown) of the engine, and a waveform shaper 27 such as a schmitt trigger circuit. The construction of the wobble plate flow-rate sensor 25 is such that disclosed in U.S. Pat. Ser. No. 4,089,221. The wobble plate flow-rate sensor 25 has a wobble plate pivotably disposed in a chamber interposed in the fuel passage, and a photo detector which produces an output signal in accordance with the vibrations of the wobble plate. Since the frequency of the vibrations of the wobble plate is in proportion to the fuel flow rate, the frequency of the output signal of the photo detector is indicative of the fuel flow rate. The output signal of the wobble plate flow-rate sensor 25 is applied to the waveform shaper 27 so that the waveform shaper 27 produces a pulse train signal of a logic level, the frequency of which is the same as the output signal of the photo detector. The pulse train signal is applied to the input 28-1 of the second counter 28 shown in either FIG. 1 or FIG. 6.

Since the number of pulses produced by the waveform shaper 72 is an indication of the fuel flow rate, the flip-flop 24 and the AND gate 26 are not required when the apparatus is used for the carburetor system. The clock pulse generator 22 in the first embodiment is necessary for applying the clock pulses to the timer 18, while the clock pulse generator 22 in the second embodiment is unnecessary. In other words, when the first embodiment is used for the carburetor system the flip-flop 24 and the AND gate 26 are substituted by the circuit arrangement shown in FIG. 8, and when the second embodiment is used for the carburetor system, the clock pulse generator 22, the flip-flop 24 and the AND gate 26 are substituted by the circuit arrangement shown in FIG. 8.

For measuring the amount of fuel supplied to the engine via the fuel passage of the carburetor, some other conventional flow-rate detectors are also available. However, it is preferable to use the above-mentioned wobble plate flow-rate sensor since the sensor is accurate especially in a range of low flow rate.

The apparatus according to the present invention has been described in conjunction with an automotive vehicle hereinabove. However, the apparatus may be used for any vehicles, such as aircrafts or ships, the primer mover of which is of a combustion engine type. It will be understood from the foregoing that the apparatus according to the present invention provides an accurate distance over which a vehicle can travel with the residual fuel wherein the distance changes time to time automatically. Further, the amount of fuel contained in the fuel tank 35 is automatically measured and thus the vehicle driver does not have to set the amount of fuel each time the fuel tank of the vehicle is fed with fuel.

It will be apparent for those skilled in the art that many modifications and changes will be made without departing from the spirit and scope of the invention which is defined by the following claims.

What is claimed is:

1. An apparatus for indicating the distance over which a vehicle can travel with the residual fuel remaining in the fuel tank of said vehicle, comprising:

(a) first means for producing a first signal indicative of the distance travelled by said vehicle with a unit amount of fuel in view of the distance travelled by said vehicle and the amount of fuel consumed by the engine of said vehicle, said first means including means for producing a second signal indicative of the distance travelled by said vehicle per a predetermined period of time, means for producing a third signal indicative of the amount of fuel supplied to said engine per said predetermined period of time, and means for dividing said distance indicated by said second signal by said amount of fuel indicated by said third signal, said means for producing said third signal including means for measuring the period of time for which fuel injectors of said engine are actuated, said measuring means including a clock pulse generator, a flip-flop responsive to the operation of said fuel injectors, gate means responsive to the flip-flop output signal for transmitting the clock pulses for a period of time for which said fuel injectors are energized, and a counter for producing said third signal by counting the number of pulses transmitted via said gate means for said predetermined period of time;

(b) second means for producing a fourth signal indicative of the amount of fuel contained in the fuel tank of said vehicle;

(c) third means for producing a fifth signal indicative of the distance over which said vehicle can travel with the amount of fuel remaining in said fuel tank by multiplying said first signal by said fourth signal; and (d) fourth means for displaying said distance indicated by said fifth signal.

2. An apparatus for indicating the distance over which a vehicle can travel with the residual fuel remaining in the fuel tank of said vehicle, comprsising:

(a) first means for producing a first signal indicative of the distance travelled by said vehicle and the amount of fuel consumed by the engine of said vehicle, said first means including means for producing a second signal indicative of the distance travelled by said vehicle per a predetermined period of time, means for producing a third signal indicative of the amount of fuel supplied to said engine per said predetermined period of time, and means for dividing said distance indicated by said second signal by said amount of fuel indicated by said third signal, said means for producing said third signal including a wobble plate flow-rate sensor disposed in the fuel passage of the carburetor of said engine, said wobble plate flow-rate sensor producing a signal the frequency of which is proportional to the fuel flow rate, and a counter for producing said third signal by counting the number of pulses produced in response to the flow-rate sensor output signal for said predetermined period of time, (b) second means for producing a fourth signal indicative of the amount of fuel contained in the fuel tank of said vehicle;

(c) third means for producing a fifth signal indicative of the distance over which said vehicle can travel with the amount of fuel remaining in said fuel tank by multiplying said first signal by said fourth signal; and (d) fourth means for displaying said distance indicated by said fifth signal.

3. An apparatus for indicating the distance over which a vehicle can travel with the residual fuel remaining in the fuel tank of said vehicle, comprising:
(a) first means for producing a first signal indicative of the distance travelled by said vehicle with a unit amount of fuel in view of the distance travelled by said vehicle and the amount of fuel consumed by the engine of said vehicle, said first means including means for producing a second signal when the distance travelled by said vehicle equals a predetermined distance, means responsive to said second signal for producing a third signal indicative of the amount of fuel supplied to said engine during a travel of said predetermined distance, and means for dividing said predetermined distance by said amount of fuel indicated by said third signal, said means for producing said third signal including a clock pulse generator, a flip-flop responsive to the operation of said fuel injectors, gate means responsive to the flip-flop output signal for transmitting the clock pulses for a period of time for which fuel injectors are energized, and a counter for producing said third signal by counting the number of pulses transmitted via said gate means during said travel of said predetermined distance;
(b) second means for producing a fourth signal indicative of the amount of fuel contained in the fuel tank of said vehicle;
(c) third means for producing a fifth signal indicative of the distance over which said vehicle can travel with the amount of fuel remaining in said fuel tank by multiplying said first signal by said fourth signal; and
(d) fourth means for displaying said distance indicated by said fifth signal.

4. An apparatus for indicating the distance over which a vehicle can travel with the residual fuel remaining in the fuel tank of said vehicle, comprising:
(a) first means for producing a first signal indicative of the distance travelled by said vehicle with a unit amount of fuel in view of the distance travelled by said vehicle and the amount of fuel consumed by the engine of said vehicle, said first means including means for producing a second signal when the distance travelled by said vehicle equals a predetermined distance, means responsive to said second signal for producing a third signal indicative of the amount of fuel supplied to said engine during a travel of said predetermined distance, and means for dividing said predetermined distance by said amount of fuel indicated by said third signal, said means for producing said third signal including a wobble plate flow-rate sensor disposed in the fuel passage of the carburetor of said engine, said wobble plate flow-rate sensor producing a signal the frequency of which is proportional to the fuel flow rate, and a counter for producing said third signal by counting the number of pulses produced in response to the flow-rate sensor output signal during said travel of said predetermined distance;
(b) second means for producing a fourth signal indicative of the amount of fuel contained in the fuel tank of said vehicle;
(c) third means for producing a fifth signal indicative of the distance over which said vehicle can travel with the amount of fuel remaining in said fuel tank by multiplying said first signal by said fourth signal; and
(d) fourth means for displaying said distance indicated by said fifth signal.

5. An apparatus for indicating the distance over which a vehicle can travel with the residual fuel remaining in the fuel tank of said vehicle, comprising:
(a) first means for producing a first signal indicative of the distance travelled by said vehicle with a unit amount of fuel consumed by the engine of said vehicle;
(b) second means for producing a second signal indicative of the amount of fuel contained in the fuel tank of said vehicle, said second means including a fuel level detector disposed in said fuel tank, said fuel level detector having a resistor substantially vertically disposed in said fuel tank at the center thereof and a movable contact arranged to move up and down by means of floating means, said movable contact sliding along said resistor for changing the resistance between said movable contact and one end of said resistor when moving up and down;
(c) third means for producing a third signal indicative of the distance over which said vehicle can travel with the amount of fuel remaining in said fuel tank by multiplying said first signal by said second signal; and
(d) fourth means for displaying said distance indicated by said third signal.

6. An apparatus as claimed in claim 5, wherein said floating means is disposed in a cylinder having openings at the upper and lower portions thereof.

7. An apparatus for indicating the distance over which a vehicle can travel with the residual fuel remaining in the fuel tank of said vehicle, comprising:
(a) first means for producing a first signal indicative of the distance travelled by said vehicle with a unit amount of fuel in view of the distance travelled by said vehicle and the amount of fuel consumed by the engine of said vehicle, said first means including means for producing a second signal indicative of the distance travelled by said vehicle per a predetermined period of time, means for producing a third signal indicative of the amount of fuel supplied to said engine per said predetermined period of time, and means for dividing said distance indicated by said second signal by said amount of fuel indicated by said third signal;
(b) second means for producing a fourth signal indicative of the amount of fuel contained in the fuel tank of said vehicle;
(c) third means for producing a fifth signal indicative of the distance over which said vehicle can travel with the amount of fuel remaining in said fuel tank by multiplying said first signal by said fourth signal;
(d) fourth means for detecting whether said distance travelled by said vehicle is over zero or not during said predetermined period of time;
(e) fifth means responsive to the output signal of said fourth means for storing said fifth signal only when the distance travelled by said vehicle during said predetermined period of time is over zero; and
(f) sixth means for displaying the distance stored in said fifth means.

* * * * *